United States Patent [19]
Vokral

[11] 3,856,489
[45] Dec. 24, 1974

[54] HOLDER FOR ANNULAR FILTER

[75] Inventor: Edward J. Vokral, Hinsdale, Ill.

[73] Assignee: Evo Corporation, Hinsdale, Ill.

[22] Filed: June 22, 1973

[21] Appl. No.: 372,523

[52] U.S. Cl................. 55/379, 55/341, 55/511, 55/DIG. 26
[51] Int. Cl............................................ B01d 46/02
[58] Field of Search ............ 55/378, 379, 376, 374, 55/341, 302, DIG. 26, 492, 497, 498, 511; 285/334.5, 7

[56] References Cited
UNITED STATES PATENTS

| | | | |
|---|---|---|---|
| 1,612,526 | 12/1926 | Mueller | 55/DIG. 26 |
| 2,775,471 | 12/1956 | Douglass | 285/334.5 X |
| 3,746,374 | 7/1973 | Sedgwick et al. | 285/334.5 X |

FOREIGN PATENTS OR APPLICATIONS

| | | | |
|---|---|---|---|
| 887,772 | 1/1962 | Great Britain | 55/379 |
| 1,191,078 | 4/1965 | Germany | 55/376 |

Primary Examiner—Frank W. Lutter
Assistant Examiner—Kathleen J. Prunner
Attorney, Agent, or Firm—Hume, Clement, Brinks, Willian, Olds & Cook, Ltd.

[57] ABSTRACT

A holder for an annular filter including a support body, a sealing annulus and a core cap. The support body has a conical section at one end and the sealing annulus has a conical section for mating with the conical section of the support body and clamping the filter between the conical sections to form a continuous seal with the annular filter. The core cap engages the sealing annulus and draws the conical section of the sealing annulus toward the conical section of the support body.

11 Claims, 3 Drawing Figures

PATENTED DEC 24 1974  3,856,489

HOLDER FOR ANNULAR FILTER

The invention relates to a holder for an annular filter such as used in air cleaning systems for cleaning particulate matter from the discharges of industrial processes. More particularly, the invention relates to a holder for an annular filter to retain the filter in a sealed engagement with a filter support body. The holder functions to seal the filter onto the filter support body and to permit replacement of the filter at periodic intervals when the filter becomes spent.

The holder for the annular filter utilizes two conical sections that are drawn toward one another for sealing the filter to the filter body. The filter is clamped between the conical sections and a continuous seal is formed around the sections with the annular filter to prevent entry of unfiltered air into the portion of the filter unit carrying filtered air. The conical sections used in the holder for the annular filter can accommodate filters having varying thicknesses by varying how closely the conical sections are drawn together. Thus, the holder operates to permit filters of different thicknesses to be interchangeably used on the same filter unit.

The holder for the annular filter also utilizes a secondary seal in order that a double seal can be provided to prevent leakage of unfiltered air into the filter unit. Thus, in the event that the conical sections do not completely seal the filter due to irregularities in the filter thickness or other causes, the secondary seal will operate to prevent leakage of unfiltered air into the filter unit.

In summary, the invention relates to a holder for an annular filter having a body means for supporting the annular filter with the body means having a first conical section for receiving the annular filter. A sealing annulus is provided that has a second conical section for sealing the annular filter to the first conical section of the body means. Means is provided for drawing the second conical section of the sealing annulus towards the first conical section of the body means to clamp the annular filter between the first conical section of the body means and the second conical section of the sealing annulus and form a continuous seal around the annular filter.

Other features of the invention will become apparent from a review of the detailed description and the drawings. One form of the invention is demonstrated in the drawings in which.

Figure 1:
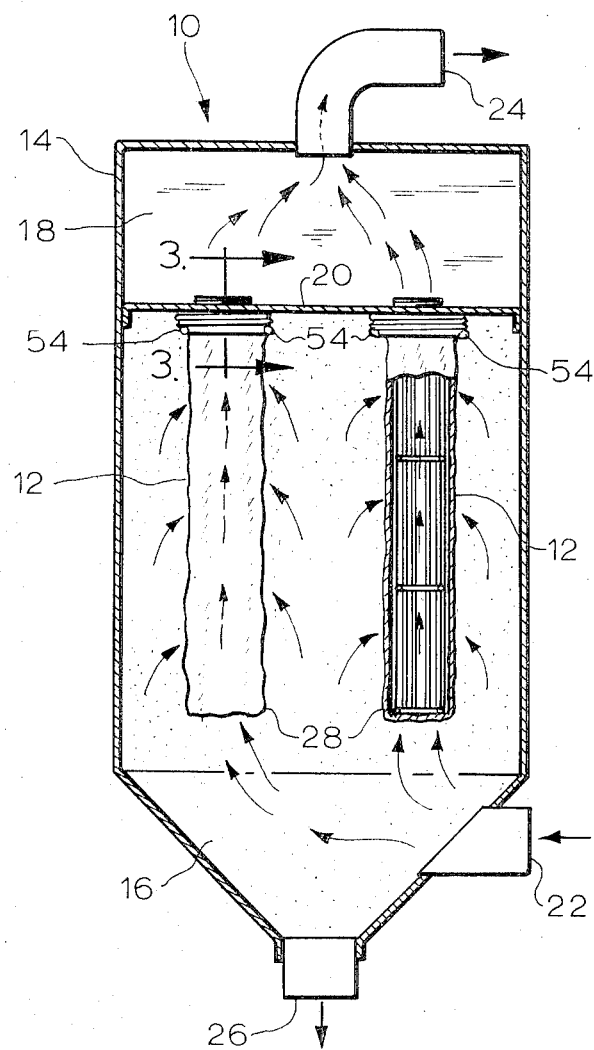
FIG. 1 is a partially cut-away view of an air cleaning system using a holder for an annular filter embodying the present invention.

Referring to FIG. 1, an air cleaning system indicated generally by the numeral 10 utilizes filter units 12 for cleaning particulate matter from particulate laden air with the filter unit 12 having a holder for annular filters embodying the present invention. The air cleaning system 10 includes a particulate separator 14 having an inlet chamber 16 and an outlet chamber 18. The inlet chamber 16 and the outlet chamber 18 are separated by a plenum divider 20. The filter units 12 are disposed in the inlet chamber 16 and are coupled to the plenum divider 20.

The air cleaning system 10 operates to remove particulate matter from particulate laden air such as results in an industrial process. The particulate laden air is supplied to the air inlet 22 of the particulate separator 14 and enters into the inlet chamber 16. The particulate laden air in the inlet chamber 16 travels through the filter units 12 into the outlet chamber 18. The filter units 12 operate to remove particulate matter from the air and supply clean, filtered air to the outlet chamber 18. Clean air in the outlet chamber 18 is discharged through the clean air outlet 24 and on to suitable discharge device (not shown).

Particulate matter that is removed by the filter units 12 falls from the filter units and exits through the particulate discharge 26 into a particulate bin (not shown). The particulate bin is sealed tightly to the particulate discharge 26 to prevent escape of the particulate laden air from the particulate discharge 26.

During the operation of the particulate separator 14, particulate matter collects on the filter units 12 and becomes caked on the outside of the filter 28. In order to clear the filter units 12 of the particulate matter, the flow of air out of the clean air outlet is reversed and as a result, a burst of clean air travels through the outlet chamber 18 and into the filter units 12. The burst of air into the filter units 12 causes the filter 28 on the filter units 12 to expand outward and knock the particulate matter from the filter, thereby cleaning the filter unit. The particulate matter falls downward and exits through the particulate discharge 26.

Figure 2:
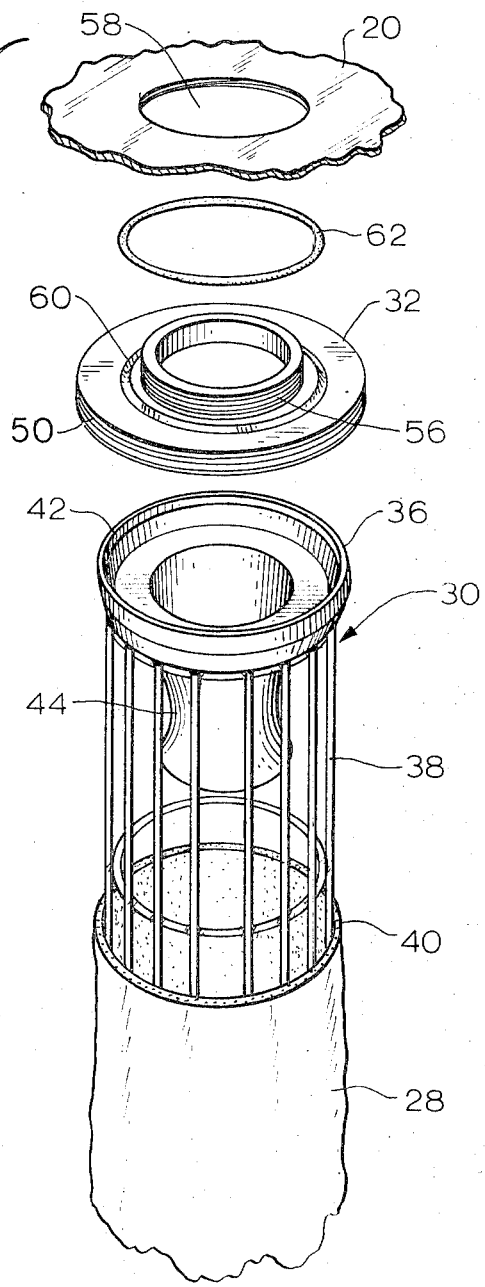
FIG. 2 is an exploded view of the holder for an annular filter embodying the present invention.
Figure 3:
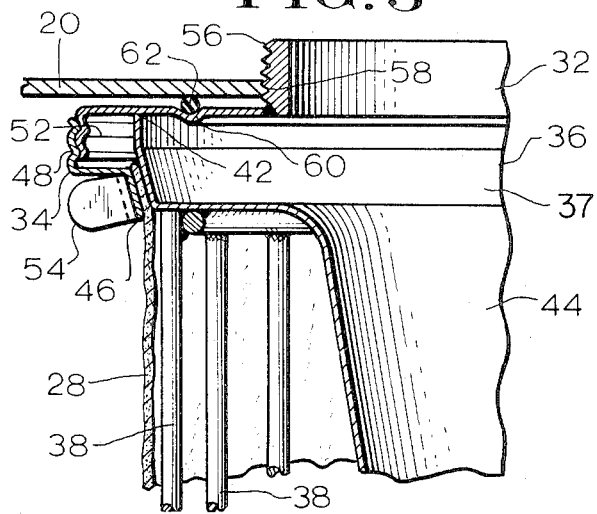
FIG. 3 is a sectional view taken along line 3—3 in FIG. 1 illustrating a holder for an annular filter embodying the present invention, as assembled in the air cleaning system.

Referring to FIGS. 2 and 3, the filter unit 12 includes a support body 30 for carrying an annular filter 28. A core cap 32 and a sealing annulus 34 cooperate with a coupling throat 36 on the support body 30 to form a holder for retaining the filter 28 in the filter unit 12.

The support body 30 includes a filter support cage 38 for preventing the collapse of the filter 28 under the pressure of particulate laden air entering the inlet chamber 16. The coupling throat 36 is arranged at one end of the support body 30 on the top end of the filter support cage 38 and includes a conical section 37 for receiving the open end 40 of the filter 28. The coupling throat 36 also includes a sealing lip 42 that extends upward from the conical section 37 to form a secondary seal with the core cap 32, as detailed. The coupling throat 36 also includes a venturi tube 44 for controlling the reverse flow of air through the filter unit 12 during the cleaning of the filter unit.

The sealing annulus 34 has a conical section 46 for sealing the open end 40 of the filter 28 to the conical section 38 of the support body 30. The conical section 46 of the sealing annulus 34 is complementary to the conical section 38 of the support body 30. The conical section 46 of the sealing annulus 34 is concentric with and surrounds the conical section 38 of the support body 30. Preferably, both of the conical sections 38 and 46 have substantially the same angle of diversions. As a result, the conical sections 38 and 46 remain substantially parallel and form a seal on the open end 40 of the annular filter 28 over a wide area.

The sealing annulus 34 has a threaded portion 48 which extends upwardly and engages with a threaded portion 50 of the core cap 32 extending downwardly from the core cap. The threaded portion 50 of the core cap 32 mates with the threaded portion 48 of the sealing annulus and serves as a drawing means to draw the sealing annulus 34 upward. As the sealing annulus 34 is drawn upward, the conical section 46 of the sealing annulus moves toward the conical section 38 of the support body 30. As a result, the open end 40 of the filter 28 is clamped between the conical sections 38 and 46 and a continuous seal is formed around the open end of the annular filter. Additionally, as the core cap 32 is threaded together with the sealing annulus 34, the sealing lip 42 is brought into engagement with the core cap 32.

The sealing lip 42 forms a secondary seal to prevent the entry of unfiltered air into the filter unit 12. Any air entering into the seal formed by the conical sections 38 and 46 with the filter 28 is trapped in the dead air chamber 52 which is formed by the core cap 32, the sealing annulus 48 and the sealing lip 42. Thus, the sealing lip 42 and the conical sections 38 and 46 provide a double seal to prevent the entry of unfiltered air into the filter unit 12.

The filter unit 12 is assembled by placing the filter 28 over the support body 30 until the open end 40 of the filter overlies the conical section 38 on the support body 30. The sealing annulus 34 is then slipped over the support body 30 and mated with the core cap 32. The core cap 32 is turned with respect to the sealing annulus 34 and the sealing annulus is closed toward the core cap. Preferably, gripping tabs 54 are provided on the sealing annulus 34 to permit firm grasping of the sealing annulus. As the core cap 32 and the sealing annulus 34 are threaded together, the conical section 46 of the sealing annulus is moved toward the conical section 38 of the support body 30. As a result, the open end 40 of the filter 28 is clamped between the conical sections 38 and 46, thereby forming a continuous seal around the open end of the filter between the conical sections.

Filters having a various thickness can be accommodated by the holder of the present invention since the relative movement between the core cap 32 and the sealing annulus 34 controls the distance between the conical section 46 on the support body 30 and the conical section 38 on the sealing annulus. The sealing lip 42 serves to engage the core cap 32 and form a secondary seal as previously detailed. It will be appreciated that the height of the sealing lip 42 can be varied depending on the configuration of the core cap 32, the sealing annulus 34 and the vertical extent of the conical section 38.

The core cap 32 preferably has a threaded neck 56 for engaging a filtering port 58 in the plenum divider 20. Additionally, the core cap 32 has an annular groove 60 that surrounds the threaded neck 56 for receiving a sealing ring 62. The sealing ring 62 is compressed between the annular groove 60 on the core cap 32 and the plenum divider 20 to form a seal and prevent unfiltered air from passing the threaded neck 56 of the core cap into the outlet chamber 18.

The filter unit 12 is assembled in the air cleaning system 10 by threading the filter unit into the filtering port 58 in the plenum divider 20 until the sealing ring is compressed against the core cap 32. The filter 28 can be replaced when it becomes spent by removing the filter unit 12 and then disassembling the sealing annulus 34 from the core cap 32. A new filter 28 can then be placed on the support body 30 and the sealing annulus 34 re-assembled with the core cap 32. The refurbished filter unit 12 can then again be placed into the air cleaning system 10.

It will be appreciated that means other than the threaded neck 56 of the core cap 32 can be used to couple the core cap of the filter unit 12 to the filtering port 58. However, the threaded neck 56 of the core cap 32 permits the filter unit 12 to be easily assembled and disassembled in the air cleaning system 10 and is preferred.

It is to be understood that various modifications can be made to the disclosed holder for an annular filter without departing from the scope of the present invention, and it is intended to cover in the appended claims all such modifications as fall within the true spirit and scope of the present invention.

What is claimed is:

1. A filter holder unit comprising:
   an annular filter having an open end;
   body means for supporting the annular filter, said body means having a first conical section at one end thereof for receiving the open end of the annular filter;
   a sealing annulus having a second conical section for sealing the open end of the annular filter to the first conical section of said body means;
   a core cap including means for drawing the second conical section of said sealing annulus toward the first conical section of said body means in such manner as to clamp the annular filter between said first and second conical sections and form a continuous seal around the open end of the annular filter; and wherein
   the first conical section of said body means has a sealing lip for engaging said core cap and forming a seal therewith.

2. The unit of claim 1 wherein said core cap has a threaded neck extending upwardly therefrom.

3. The unit of claim 2 wherein said core cap has an annular groove for retaining a sealing ring.

4. The unit of claim 1 wherein the angle of divergence of the first conical section of said body means and the angle of divergence of the second conical section of said sealing annulus are substantially the same.

5. The unit of claim 4 wherein said sealing annulus includes a first threaded portion and the drawing means of said core cap includes a second threaded portion for mating with the first threaded portion of said sealing annulus.

6. The unit of claim 5 wherein said body means includes a filter support cage, said first conical section of said body means being positioned at one end of said filter support cage.

7. The unit of claim 1 wherein the second conical section of said sealing annulus is concentric with and surrounds the first conical section of said body means.

8. A filter holder unit comprising:
   an annular filter;
   body means for supporting the annular filter, said body means having a first conical section for receiving the annular filter;
   a sealing annulus having a second conical section for sealing the annular filter to the first conical section of said body means;
   means for drawing the second conical section of said sealing annulus toward the first conical section of said body means in such manner as to clamp the annular filter between the first conical section of said body means and the second conical section of said sealing annulus and form a continuous seal around the annular filter; and wherein
the first conical section of said body means has a sealing lip for engaging said drawing means and forming a seal therewith.

9. The unit of claim 8 wherein said sealing annulus has a first threaded portion and said drawing means has a second threaded portion for mating with the first threaded portion of said sealing annulus.

10. The unit of claim 9 wherein the angle of divergence of the first conical section of said body means and the angle of divergence of the second conical section of said sealing annulus is substantially the same.

11. The unit of claim 8 wherein the second conical section of said sealing annulus is concentric with and surrounds the first conical section of said body means.

* * * * *